UNITED STATES PATENT OFFICE.

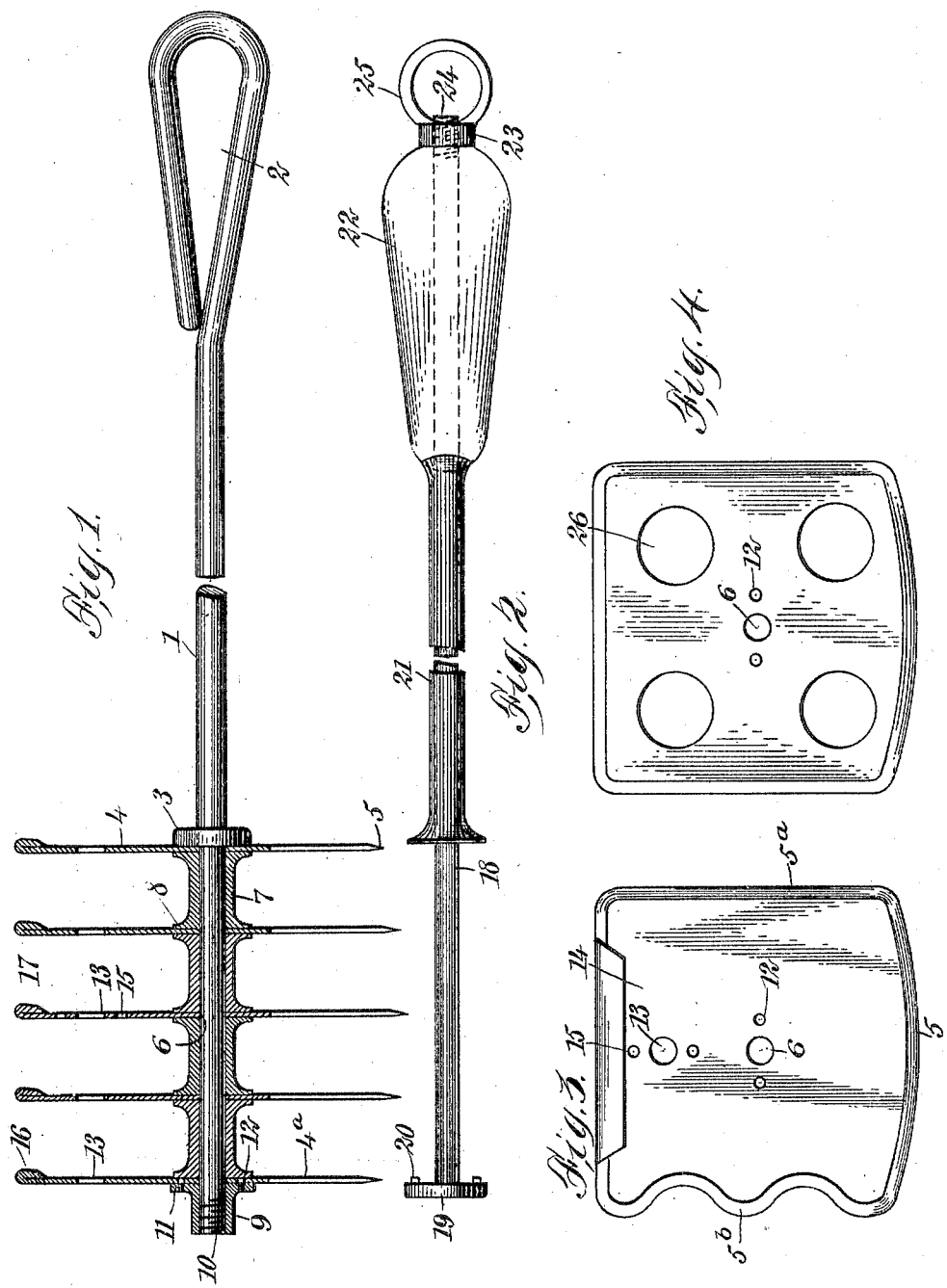

FRANK BEUCKMAN, OF EAST ST. LOUIS, ILLINOIS.

MEAT-TENDERER AND VEGETABLE-CHOPPER.

No. 816,955.  Specification of Letters Patent.  Patented April 3, 1906.

Application filed July 14, 1905. Serial No. 269,611.

*To all whom it may concern:*

Be it known that I, FRANK BEUCKMAN, a citizen of the United States, and a resident of East St. Louis, in the county of St. Clair and State of Illinois, have invented a new and Improved Meat-Tenderer and Vegetable-Chopper, of which the following is a full, clear, and exact description.

This invention relates to meat pounders and choppers and vegetable-choppers, such as used in kitchens for preparing food.

The object of the invention is to produce a device of this kind which is simple in construction and which will present a plurality of blades operating simultaneously upon the food.

The invention consists in the construction and combination of parts to be more fully described hereinafter and definitely set forth in the claims.

Reference is to be had to the accompanying drawings, forming a part of this specification, in which similar characters of reference indicate corresponding parts in all the figures.

Figure 1 is a section through the head of the device, showing the rod thereof in elevation and broken away. Fig. 2 is a side elevation showing a modified construction for a part of the device, parts being broken away and the blades being omitted. Fig. 3 is a rear view of one of the blades of the device, and Fig. 4 is a view showing a modified form which the blade may take when the device is adapted to a slightly-different purpose.

Referring more particularly to the parts, 1 represents the body of the device, which consists, preferably, of a stout rod of steel or iron bent at one extremity to form a handle 2. Near the opposite extremity of this rod a collar 3 is rigidly attached thereto. Upon the bar 1 beyond the collar 3 I mount a plurality of blades 4, which are substantially square in form, with slightly-curved lower edges 5. These blades have openings 6 located substantially centrally thereof, and through these openings the bar 1 passes, as indicated. These blades 4 are preferably five in number, as shown, the blades toward the middle being somewhat larger in their lower portion, so that their lower edges project slightly beyond the level of the others. The blades are maintained apart by sleeves or thimbles 7 disposed therebetween, as shown, and having enlarged heads 8, which abut against the sides of the blades. The blades are all clamped firmly together by means of a clamping-nut 9, which screws upon the threaded extremity 10 of the bar 1, as indicated. At its inner face the diameter of this nut is enlarged, as shown, and at this point projecting pins 11 are provided. The outermost of the blades 4, which I now designate by the numeral $4^a$, is provided with small openings 12, which receive the projecting portions of the said pins 11. In securing the blades on the handle the blades will be placed on the handle in the manner illustrated and their edges will be allowed to rest against a surface, whereupon the handle will be rotated, so as to tighten the nut and clamp all the blades rigidly together. While I prefer to attach the blades to the bar at substantially their middle point, as illustrated, I provide means for attaching them nearer their rear edges to enable them to chop deeper. For this purpose the blades are provided with auxiliary openings 13, preferably alining, as shown, and disposed as suggested. As illustrated in Fig. 3, one of these blades (designated as 14) may have its auxiliary opening 13 provided with smaller opposite openings 15, similar to the openings 12 referred to in connection with the blade $4^a$. These openings 15 are adapted to receive the pins 11 in the same manner as the blade $4^a$ when the blades are assembled with the bar near their rear edges. The upper edges of the blades 4 are preferably formed with extensions, which are bent over so as to form rounded butts 16.

As indicated in Fig. 3, the lower edges 5 are preferably curved slightly, so as to constitute an efficient scraper. The side edges $5^a$ are straight and the edges opposite them are preferably formed with teeth $5^b$ or with similar irregularities adapted to lacerate the meat in pounding.

In using the device the handle 2 would be grasped in one hand and blows would be delivered with the head 17, which the assembled blades constitute. In treating meat before cooking the impact of the sharp edges 5 against the meat will lacerate the same and stimulate the flow of the juices. The pounding which would afterward be delivered by the rear edges or butts 16 of the blades assists in softening the meat and rendering it tender. The device evidently constitutes a vegetable-chopper for making chow-chow, &c., as well as a meat-pounder and chopper. It also constitutes a scraper.

Instead of constructing the device as described I may adopt the form shown in Fig. 2. In this instance I provide a central bar or rod 18, provided at its outer extremity with a fixed head 19, and on the inner face of this head projecting pins 20 are provided, which correspond in position and function to the pins 11 aforesaid. The blades and sleeves are received upon the rod in the manner before described and are clamped in position by a retaining-sleeve 21, which extends from the handle 22. This handle 22 has a bore enabling it to be slipped over the rod, as will be readily understood, and is forced against the sleeve by a nut 23, which screws upon the threaded extremity 24 of the central rod. This nut 23 is preferably integral with a ring or eye 25.

The blades of the device may be provided with enlarged openings 26, as illustrated in Fig. 4, and these openings admirably adapt the device for stirring batter and enable the device to be used in other culinary operations.

The device evidently constitutes a convenient meat-pounder and vegetable-chopper and may have the other functions referred to. The device is also evidently of simple construction and may be readily manufactured at a low cost. By reason of the connection between the clamping-nut 9 and the outermost blade 4$^a$, which was described in connection with the preferred form of the device, there is no necessity for the use of a wrench or tool of any kind in assembling the blades upon the bar.

Having thus described my invention, I claim as new and desire to secure by Letters Patent—

1. A device of the class described, comprising a bar having a fixed collar, a plurality of blades having openings disposed upon said bar, a plurality of sleeves disposed between said blades and maintaining the same apart, and means for clamping said blades to said collar, said blades having auxiliary openings near the edges thereof, to receive said bar.

2. A device of the class described, having a rod with a fixed collar, a plurality of blades mounted upon said rod, a plurality of thimbles disposed between said blades and maintaining the same apart, said rod having a threaded extremity, a nut adapted to screw upon said extremity, and interlocking means between said nut and the outermost of said blades.

3. A device of the class described, comprising a bar having a fixed collar, a plurality of blades having alining openings receiving said bar, thimbles disposed between said blades and maintaining the same apart, said blades having cutting edges on three sides and butt edges for pounding, on the opposite side, said blades having auxiliary alining openings which may receive said bar, said bar having a threaded extremity and a nut mounted upon said extremity and having projecting pins on the inner face thereof, the outermost blade having openings receiving said pins.

In testimony whereof I have signed my name to this specification in the presence of two subscribing witnesses.

FRANK BEUCKMAN.

Witnesses:
HENRY BEUCKMANN,
EMILE J. EGGMANN.